Figure 1:
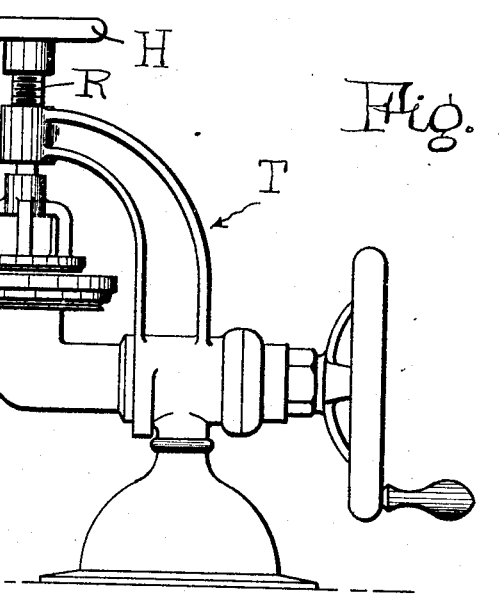

March 4, 1930.     S. N. SENNA     1,749,265
TESTING MACHINE
Filed June 18, 1928

INVENTOR.
Samuel N. Senna
BY Walter C. Ross
ATTORNEY

Patented Mar. 4, 1930

1,749,265

UNITED STATES PATENT OFFICE

SAMUEL N. SENNA, OF CHICOPEE, MASSACHUSETTS, ASSIGNOR TO B. F. PERKINS & SON, INC., OF HOLYOKE, MASSACHUSETTS, A CORPORATION OF MASSACHUSETTS

TESTING MACHINE

Application filed June 18, 1928. Serial No. 286,256.

This invention relates to improvements in testing machines and is directed particularly to improvements in specimen clamping devices for use in connection with machines for testing the tensile strength of paper and the like.

A well-known form of machine for testing paper and the like comprises an apertured specimen platform, an apertured clamp for clamping a specimen to the platform and a yieldable diaphragm below the platform, which is distended by a fluid through the aperture therein to distend and rupture the specimen, the pressure of the liquid at the time of rupture being read on a gauge and used as an arbitrary indication of the strength of the paper or other specimen being tested. The platform and clamp of the apparatus described are of metal and the adjacent faces thereof are substantially smooth and non-yieldable so that in order to hold the specimen against movement during the testing operation a considerable or in fact excessive clamping pressure is necessarily employed. This pressure subjects the specimen to excessive strains so as to displace the fibers thereof and it is often ruptured by the diaphragm more readily or at a less pressure than would be the case if the specimen was not so injured.

According to the principal object of this invention I provide a novel clamping means in connection with apparatus of the class described whereby the specimen is held for the distending thereof without the excessive pressure referred to so that the consequent injury is obviated and an accurate test obtained. This is accomplished by means of the novel combination and arrangement of parts constituting the invention which for purposes of disclosure will be described in the form at present preferred and which is illustrated in the accompanying drawings.

Figure 2:
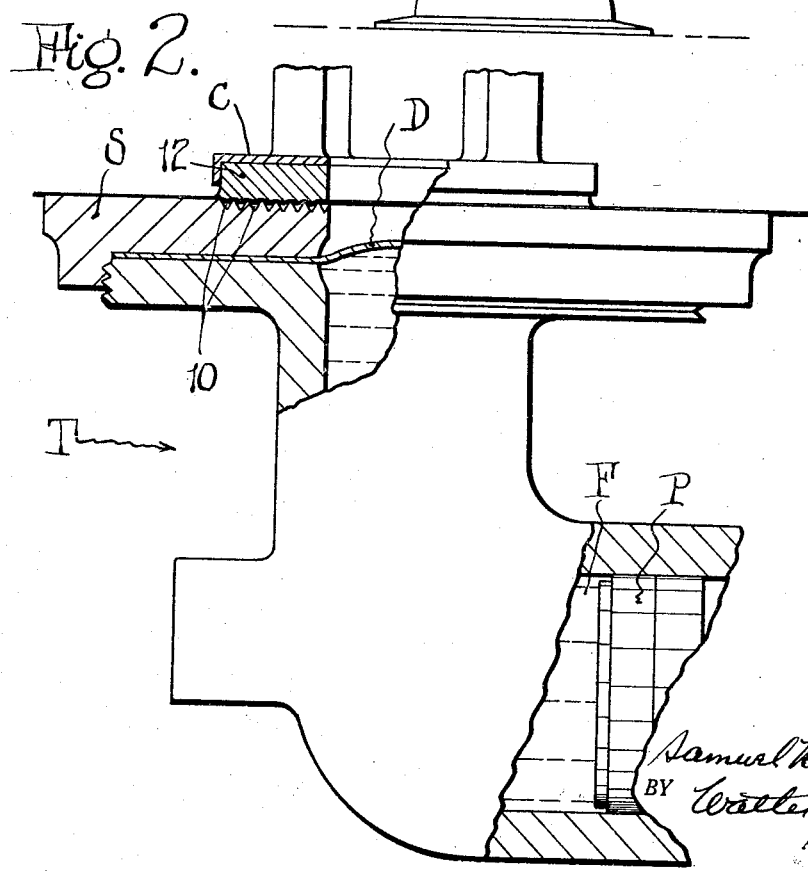

In the drawings:

Fig. 1 is a small scale side elevational view of one form of a testing machine having the features of the invention associated therewith, and Fig. 2 is a partial elevational view at a larger scale with certain parts in section to show the novel features of the invention.

Referring now to the drawings in detail the invention will be described. A testing machine of the type referred to is represented at T which has a fluid chamber F and a piston P reciprocable therein to force a liquid in the chamber against a yieldable diaphragm D which is clamped to the upper side of the chamber by a platform or specimen support S. A rod R in threaded engagement with the upper end of the frame of the machine is provided with a hand wheel H for rotating the same and which on its lower end carries a specimen clamping member C. The structure just described is generally old in the art and will not be gone into in detail. The purpose of the clamp C is to clamp a specimen of paper or the like to the support S so that the diaphragm may be distended by the fluid to rupture the specimen while it is so held. The pressure of the liquid at the instant of rupture is usually recorded by a gauge which is represented at G, which pressure is taken as the designation of the strength of the specimen.

As has been previously stated, it is usual to provide the ring-like clamping member C and the upper side of the apertured platform S with substantially smooth specimen clamping surfaces. Since these parts are of metal there results non-yieldable hard surfaces for clamping of the paper and in order that the specimen may be securely clamped by the surfaces which are smooth and hard, it is of course obvious that an excessive or at least a considerable clamping pressure must be applied. This tends to injure the specimen, and in the case of paper is likely to break the fibers thereof, so that the specimen actually ruptures at a less pressure than it should. It will be noted that since the specimen is distended upwardly through the platform and clamp by the diaphragm that it is of course elongated to some extent and that also for best results it is desired to clamp the specimen firmly about the central portion which is to be distended and finally ruptured.

According to the novel features of my invention for firmly clamping the specimen, I provide in the upper face of the supporting platform S a roughened portion about the aperture therein. This may be accomplished in one way by knurling the said surface or by cutting concentric grooves 10 in a spaced relation therein. To co-operate with this roughened surface I secure to the clamp a resilient or yieldable ringlike clamping member in the form of a pad 12 which may be of rubber or some other suitable material. This pad 12 is preferably ringlike as described to provide an aperture therethrough to correspond with the apertures in the platform and clamp C and may be secured to the lower side of the clamp by any convenient manner. In operation by means of the novel features described, the specimen is pressed against the roughened surface of the platform S by the ringlike yieldable pad in the manner shown in Fig. 2, and it will be noted that the yieldable clamping pad forces the specimen at least partly into the grooves of the platform so that as pressure is applied to the under side of the specimen by the fluid actuated diaphragm it is securely held around the aperture against a relative movement with respect to the platform and clamp. By reason of the novel combination and arrangement of parts shown and described, the specimen is not only firmly held against displacement for the testing operation, but the co-acting clamping members do not tend to injure or disrupt the fibers of the specimen whereby it is not likely to be ruptured in testing until the extreme pressure at which it will rupture has been attained.

By means of the novel features of the invention it is possible to obtain more accurate tests than have been possible heretofore and specimens of varying thicknesses by reason of the yieldable characteristics of the clamp are clamped firmly and properly for the testing operations.

I am aware that many changes may be made in the form of the invention without departing from the spirit and scope thereof and I prefer therefore to be limited, if at all, by the appended claims rather than by the foregoing description.

What I claim is:

1. A machine of the class described comprising in combination, a platform member having a specimen supporting surface and a central aperture therethrough, a clamp member having a specimen engaging surface and a central aperture therethrough, the surfaces of said members being relatively yieldable and non-yieldable and one of said surfaces being provided with depressions whereby a specimen may be forced therein by the other surface.

2. A machine of the class described comprising in combination, a platform for supporting a specimen having a central opening therethrough for receiving a diaphragm, a diaphragm below said platform, a clamp movable towards and away from said platform, the supporting surface of said platform being substantially non-yieldable and provided with concentric grooves disposed about said central opening and the said clamp being provided with a ring-like yieldable clamping member disposed thereon so as to overlie the grooves of said platform and co-operate therewith for clamping a specimen thereto.

3. A machine of the class described comprising in combination, apertured specimen clamping members including a platform member and a clamp member, one of said members having a yieldable surface and the other a rigid surface which is provided with depressions whereby a specimen may be clamped therebetween by being forced into the depressions by the yieldable surface.

4. A machine of the class described comprising in combination, a platform member for supporting a specimen having a central opening, a yieldable diaphragm below said platform, a clamp member movable towards and away from said platform, the surface of one of said members being non-yieldable and provided with depressions about the central opening therein and the other member being provided with a ring-like clamping member of yieldable material disposed thereon so as to overlie the depressions of the other member for co-operating therewith for clamping a specimen.

SAMUEL N. SENNA.